Figure 1:
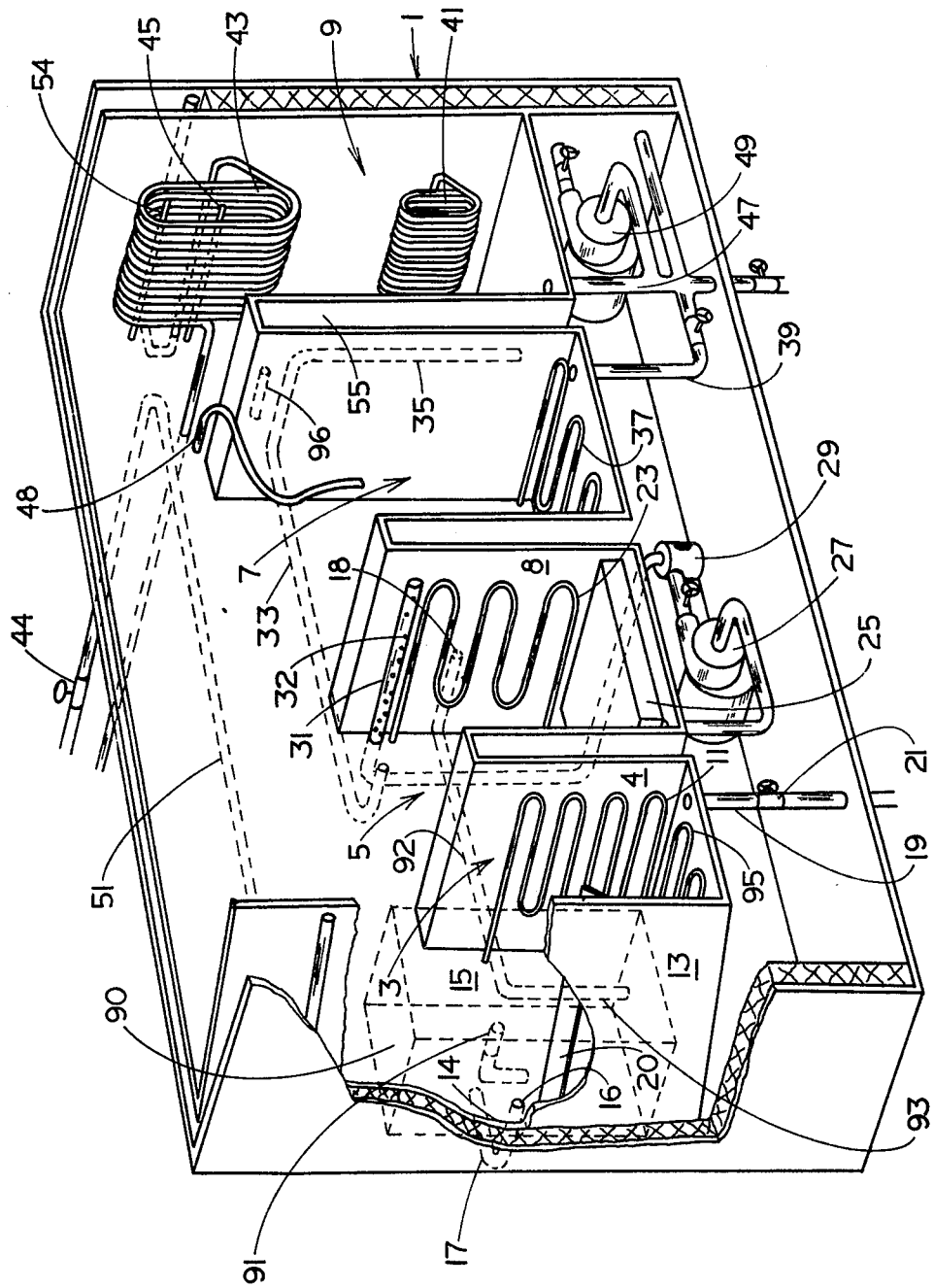

United States Patent [19]

McCord

[11] 4,078,974
[45] Mar. 14, 1978

[54] VAPOR GENERATING AND RECOVERING APPARATUS INCLUDING VAPOR CONDENSER CONTROL MEANS

[76] Inventor: James William McCord, 9829 Timberwood Cir., Louisville, Ky. 40223

[21] Appl. No.: 665,426

[22] Filed: Mar. 10, 1976

[51] Int. Cl.² .............................................. B01D 3/42
[52] U.S. Cl. ................................. 202/186; 202/160; 202/170; 202/206; 203/2; 203/87; 203/DIG. 18; 196/141
[58] Field of Search ............ 203/2, DIG. 4, DIG. 18, 203/87, 20; 202/160, 170, 170 D, 186, 185 R, 206; 196/141

[56] References Cited

U.S. PATENT DOCUMENTS

| | | | |
|---|---|---|---|
| 2,243,093 | 5/1944 | Flahive | 202/170 |
| 2,447,840 | 8/1948 | Boss | 202/170 |
| 2,783,975 | 5/1957 | Lans | 202/170 |
| 2,867,225 | 1/1959 | Zademach et al. | 202/170 |
| 3,011,956 | 12/1961 | Smith et al. | 203/20 |
| 3,417,001 | 12/1968 | Fletcher | 202/181 |
| 3,479,252 | 11/1969 | Holm et al. | 203/2 |
| 3,483,092 | 12/1969 | Young | 203/2 |
| 3,563,861 | 2/1971 | Fletcher | 203/1 |
| 3,699,006 | 10/1972 | Hasslacher | 203/DIG. 4 |

*Primary Examiner*—Wilbur L. Bascomb, Jr.

[57] ABSTRACT

A vapor generating and recovering apparatus including vapor condenser control means wherein one component is separated from a second component of a liquid solution by vaporization and then recovered by condensing including at least one chamber for vaporizing the first component from the liquid solution and a second chamber for recovering the vapor, the vapor generating chamber being in heat emitting relation with a heat emitting means and the vapor recovering chamber being in heat abosrbing relation with a heat absorbing means, the heat absorbing means including a temperature sensing device at a preselected position within the second chamber to control the vapor level of the vaporized component, the sensing device actuating a cooling fluid which is included within the heat absorbing means whereby the vapor level in the apparatus is controlled by the temperature sensing device in combination with the heat absorbing control means.

6 Claims, 2 Drawing Figures

VAPOR GENERATING AND RECOVERING APPARATUS INCLUDING VAPOR CONDENSER CONTROL MEANS

BACKGROUND OF THE INVENTION

This invention relates to a condenser control means for a vapor generating and recovering apparatus wherein one component is separated from a second component of a liquid solution by vaporization and then recovered by condensing and more particularly relates to a condensing control device for controlling the vapor level in an apparatus for vapor generating and recovering wherein one component is separated from a second component of a liquid solution by vaporization and then recovered by condensing.

In the present state of the art, vapor generating and recovering devices for separating one component from a second component of a liquid solution are utilized in many different areas. For example, in the cleaning of objects such as metallic tools, plastic parts, and the like, hot, boiling solvents have been utilized to remove undesirable particulate matter from these tools, parts, and the like by immersing the soiled object into the hot, boiling solvent. In bringing the solvent to a boiling temperature, a solvent vapor zone is created above the boiling solvent solution in the tank or chamber in which the aforementioned objects are placed for cleaning. The vaporized solvent is then subjected to cooling or condensing means and is recovered. Generally, the chamber or tank from which the solvent is vaporized is filtered or processed by other means to remove the contaminants therefrom and then reused.

SUMMARY OF THE INVENTION

It has now been found that in a vapor generating and recovering apparatus for separating by vaporization one component from a second component of a liquid solution in the cleaning of objects in one compartment and then recovering the separated component in a second compartment, the control of the vapor level is essential. It has been found that by installing a weir of preselected height between the first chamber and the second chamber with a temperature sensing device disposed at approximately the same level as the top of the weir, the vapor level can be maintained at a predetermined level. The apparatus includes a condensing coil and a convection control (perimeter) coil extending around the perimeter of the chambers at a preselected height above the weir wherein the heat absorbing ability of the condensing coil is determined in response to the temperature sensing device thereby controlling the vapor level of the vaporizing first component.

In preferred utilization of the present invention, specifically in relation to a vapor cleaning device, a more fully described apparatus is hereinafter discussed. Various other features of the present invention will also become obvious to those skilled in the art upon reading the disclosure set forth hereinafter.

More particularly, in one preferred embodiment, the present invention provides in a vapor generating and recovering apparatus for separating and recovering one component from a second component of a liquid solution having a housing including at least one chamber therein for vaporizing a first component from a liquid solution containing at least two components therein and a second chamber for recovering the vapor in the form of a liquid, heat emitting means disposed in heat emitting relation with the first chamber, heat absorbing means disposed in heat absorbing relation with the second chamber and around the periphery of the housing at a preselected distance above the chambers, the improvement which comprises: a weir of preselected height disposed between and separating the first chamber from the second chamber, a temperature sensing device disposed within the second chamber at a preselected position at approximately the same vertical position as the top of the weir, and the heat absorbing means including coils with a heat transfer fluid therein with flow control means responsive to the temperature sensing device whereby the heat absorbing means is responsive to preselected temperature conditions at the top of the weir.

It is to be understood that the description of the examples of the present invention given hereinafter are not by way of limitation and various modifications within the scope of the present invention will occur to those skilled in the art upon reading the disclosure set forth hereinafter.

Figure 2:
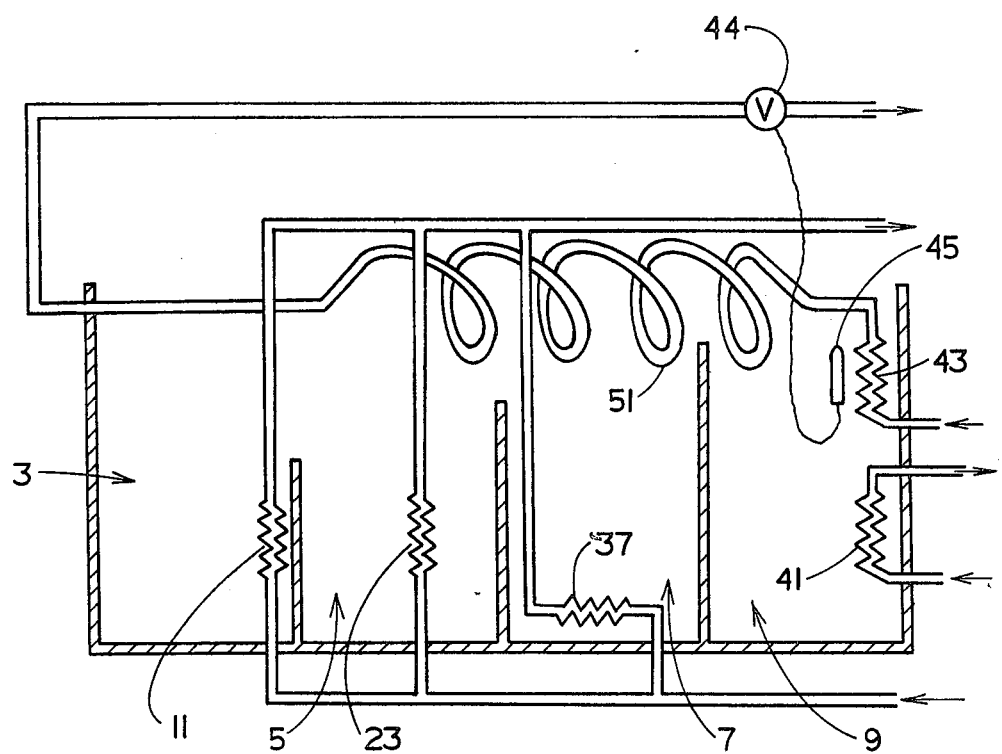

Referring to the drawings:

FIG. 1 is a perspective view, partially broken away, of a vapor cleaning apparatus utilizing a heat absorbing means and temperature sensing device of the present invention; and, FIG. 2 is a schematic diagram of the heat emitting means, heat absorbing means, and temperature sensing means utilized in the vapor cleaning apparatus of FIG. 1.

In the Figures, a housing 1 includes two chambers therein, one for vaporizing one component of a two component system and the other for condensing the vapor and recovering the same as a liquid. The first or vaporizing chamber includes a plurality of sub-chambers 3, 5 and 7 and the condensing and recovering chamber is identified by the numeral 9. These chambers or sub-chambers are provided therein for the cleaning of pbjects, specifically those containing greasy substances thereon which may be removed by utilizing a composition containing a solvent. The sub-chamber 3 includes a heating element 11 therein disposed along wall 4 which provides heat to a solution which is normally disposed within the sub-chamber 3, the solution containing a vaporizable solvent therein. The heating element 11 is preferably electrical but may be a condensing coil (FIG. 2) in a refrigeration system or a coil or element supplied with heat from other known sources. The element 11 provides sufficient heat to the sub-chamber 3 to boil and vaporize the solvent therein, the boiling action providing the cleaning power for the solvent solution. Sub-chamber 3 is also provided with a wall 13 which is tapered in relation to the back wall 15. In one preferred vapor cleaning apparatus it has been found that by attaching the heating element 11 to or adjacent to the wall 4, a temperature differential is created across the sub-chamber 3, the temperature differential causing the solution to move toward the wall 13. By constructing the opposed wall 13 in a non-parallel relationship with wall 4, the solution moves to the corner furtherest from wall 4, in this example, the corner 14 formed by the walls 13 and 15. Thus, all of the low density particles which are removed from the objects being cleaned float on or near the top of the heated solution and migrate rapidly to the corner 14. An aperture 16 is provided at or adjacent to the corner 14 at a preselected position, the position being disposed for alignment with the solution level to be maintained in the sub-chamber 3. A conduit 17 is in fluid communication with the aperture 16 at one end and a liquid or water separator 90 wherein the water or other liquids lighter in density than the solvent are removed therefrom. the separator 90 includes a conduit 91 therein which is disposed at a preselected height slightly below the height of the incoming conduit 17 to remove by gravity the lower density liquid on the top to a drain (not shown). A conduit 92 is also provided with a downwardly extending portion 93 extending to a preselected position above the bottom of the separator to remove the solvent therefrom. The opposed end of the conduit 92 is in fluid communication with an aperture 18 in the wall of chamber 7. Thus, the top portion of the solution in sub-chamber 3 containing the floating dirty particles thereon are removed by the conduit 17 through separator 90 and transferred by gravity through conduit 91 to a drain with the heavier solvent being transferred for reuse to sub-chamber 7.

It is further noted that in the migration of the boiling solution away from the heating element 11, the solution moves in a rolling motion. Thus, a baffle plate 20 is provided at the corner 14 at a position a preselected distance below the aperture 16 thereby preventing the rolling action of the boiling solution at the discharge. This prevents low density particles from rolling and building up at the discharge aperture 16 and thereby forces the particles out of the chamber through aperture 16.

At the bottom of the sub-chamber 3, a drain line 19 is provided with a valve 21 therein for periodically draining the sub-chamber 3.

There may also be provided in the bottom of the sub-chamber 3 an additional heat emitting device 95 which is generally used at the start-up of the heating cycle to decrease the heat-up time for bringing the apparatus to operating temperatures.

In sub-chamber 5 a second heating element 23 is provided to heat up the solution containing the solvent, the heat generally required being that necessary to heat the solution containing the solvent to the required temperature sufficient to perform the intended function which may be boiling the solvent contained therein. The heating element 23 is generally electrical but may be a condensing coil (FIG. 2) in a refrigeration system, or a heating coil or element transmitting heat from any other known source.

Sub-chamber 5 is also provided with a sonic vibrating means exemplified as ultrasonic transducer 25, ultrasonic transducer 25 being activated in response to an ultrasonic generator (not shown). The ultrasonic transducer 25 provides ultrasonic vibrations which initiates cavitation in the boiling solvent to remove hard to clean parts from the objects to be cleaned. Generally, sub-chamber 5 is used in the second step in a cleaning process wherein the easy to remove dirt or soil is removed in the first step of immersion of the object to be cleaned into sub-chamber 3.

Sub-chamber 3 is further provided with a recirculation system for continually recycling the solution in the chamber and removing particulates therefrom, the system including a pump 27 in fluid communication with a filter 29. Filter 29 is provided to remove the insoluble particulate matter from the solution, returning the filtered solution by way of conduit 30 to the top of the chamber through the spray header 31, spray header 31 being provided with a plurality of spray apertures 32 therein. This filtered solution is resupplied to sub-chamber 5 in a skimming manner from conduit 30 to cause floating soils to be pushed over the weir or wall 4. Also disposed along the top of the sub-chamber 5 is a conduit 33 which extends over and into chamber 9, conduit 33 communicating with a downwardly extending conduit 35. Conduit 35 includes an inlet therein spaced a preselected distance above the bottom of the chamber 9 whereby dry fresh distillate to the sub-chamber 5 is supplied during operation.

The wall 4 which is disposed between sub-chambers 3 and 5 extends in a vertical position, the top of the wall 4 being below opposed walls 13 and 8, wall 8 being disposed between sub-chambers 5 and 7. Wall 4 is of a preselected height, the height being the solution level which is to be maintained in sub-chamber 5. In operation, solution containing dirty materials therein is continually overflowing sub-chamber 5 into chamber 3 as the heating element 23 warms or boils the solution therein.

Sub-chamber 7 which receives the overflow containing the chemical solution and particulate matter floating on or near the top of the solution in sub-chamber 3 is provided with a heating element 37 which may be electrically supplied or the condensing coil (FIG. 2) in a refrigeration system or it may be an element or coil with heat supplied from any known source. Element 37 is generally positioned along the bottom of the sub-chamber 7. The solution maintained in sub-chamber 7 is generally heated to and maintained at a temperature equal to or above the vaporizing temperature of the solvent which is in the solution sub-chamber 7 thereby boiling and vaporizing the solvent therefrom. This sub-chamber is also used for a third step in the cleaning process in a cleaning device, primarily the rinsing by condensation of the object which has been cleaned.

Also provided in sub-chamber 7 is a discharge conduit 39 for periodic cleaning and draining of this chamber.

Chamber 9 which is the vapor recovering chamber for the solvent cleaning apparatus of the present invention includes a cooling coil 41 with water therein as the cooling media. The solution in this chamber is usually maintained at a substantially low temperature, the temperature being low enough to maintain the solvent in a liquid solution. It is realized that other cooling fluids may be used as the cooling media without departing from the scope and spirit of the present invention.

Disposed in the upper portion of the chamber 9 is a second cooling coil or vapor condensing coil 43 which also contains water as the cooling media therein. The cooling coil 43 absorbs heat from the vapors evolving from sub-chambers 3, 5 and 7 thereby condensing the solvents and collecting the condensed solvents in the chamber 9.

Disposed within the area enveloped by the vapor condensing coil 43 is a vapor control probe 45 which is a temperature sensing device which actuates a flow control valve 44, the valve in turn controlling the flow of heat transfer fluid in cooling coil 43, thereby maintaining a temperature in zone around the coil 43 at a preselected temperature.

Also disposed in fluid communication with chamber 9 is a conduit 96, conduit 96 being disposed at a preselected level within the chamber 9 to separate water from the heavier density solvent. Conduit 96 at its opposed end is generally in flow communication with a drain (not shown).

In fluid communication with the bottom of the chamber 9 is a conduit 47, conduit 47 being in fluid communication at its opposite end with a pump 49. Conduit 47 in combination with pump 49 provides the means for removing the solvent solution from the chamber 9 and transferring the solution by means, such as a hose 48, to any of the sub-chambers 3, 5 and 7 in order to provide additional solution to the aforementioned chambers. Hose 48 may also be in fluid communication with a fluid source (not shown), in order to provide a fluid seal of the solvents in the chambers during shutdown. The fluid utilized is one that has a low degree of vaporization at ambient temperature and pressure and is lighter in density than the solvent, for example, water.

Another thermostatic sensing device 54 is placed within the area enveloped by coil 43 above sensor 45 to detect a rising vapor to an unsafe level. This device 54 is in electrical communication with the heat source for the heat emitting means for sub-chambers 3, 5 and 7 to deactivate the heat emitting means source at a preselected temperature.

Around the outer periphery of a housing defined by and at a preselected distance above the sub-chambers 3, 5 and 7, and chamber 9 is a cooling coil 51, cooling coil 51 being disposed around the outer periphery of the housing 1 enables the inner wall surfaces of the chambers to be left in a substantially smooth condition. The cooling coil 51 generally containing water therein, as the cooling media, is in series with the aforementioned coil 43, the cooling coil 51 being provided to maintain a preselected temperature in the housing below the vaporizing temperature of the solvent thereby preventing the vaporized solvent from escaping by convection from the housing. Furthermore, the coil 51 in combination with the cooling coil 43 in chamber 9 forces the condensed vapors to move in a direction along the housing from sub-chambers 3, 5 and 7 and into the chamber 9. Since the temperature adjacent to and disposed within chamber 9 is maintained at a level below the vaporizing temperature of the solvent and a pressure drop exists by changing phase from vapor to liquid then the solvent condenses and precipitates into chamber 9 as discussed previously. Also, coil 51 is normally maintained at a temperature above the atmospheric dew point to minimize the introduction of free water into the cleaning apparatus and is operated in response to a preselected temperature condition of temperature sensing device 45 since the valve 44 is disposed in the outlet conduit from coil 51, valve 44 being operated in response to sensing device 45 as noted hereinbefore.

In the cleaning apparatus of the present invention, the cooling coil 51 in combination with weir or wall 55, wall 55 being disposed between sub-chamber 7 and chamber 9, defines the zone between what is referred to as a vapor zone and a freeboard zone in the cleaning apparatus, the vapor zone being the zone between the top of the sub-chambers 3, 5 and 7 and the top of weir 55 with the freeboard zone being the area above the vapor zone to the top of the cleaning apparatus. Wall or weir 55 also sheilds the solvent condenser 43 from the vapor generating portion of the housing until preselected operating conditions are obtained. The weir 55 is of a predetermined height with the temperature sensing device 45 being located at approximately the same vertical position. It has been found that by locating the temperature sensing device 45 within the area enveloped by the condensing coil 43 and at the same vertical level as the top of weir 55, more efficient control of the vapor level can be maintained, the temperature sensing device 45 actuating the flow control valve 44 which regulates the flow of cooling fluid in the cooling coils 43 and 51.

In the operation of the cleaning apparatus of the present invention, a solution containing a solvent is maintained in sub-chambers 3, 5 and 7 wherein the sub-chambers by means of elements 11, 23 and 37, respectively, maintain a temperature of the solution in these chambers above the vaporizing temperature of the solvent in the solution. Objects which are to be cleaned, polished, dried, developed, or degreased are immersed firstly into the solution within the sub-chamber 3 whereby the primary cleaning of the object is accomplished by dissolution utilizing the heated solvent therein. The objects are then removed from the sub-chamber 3 and inserted into the heated solvent solution in sub-chamber 5 which also includes the untrasonic transducer 25 therein which not only removes and dissolves the particles remaining on the objects by dissolution, but the ultrasonic transducer 25 provides for pressure waves which removes other particles therefrom by the cavitation action produced by the waves. The objects to be cleaned are then removed and rinsed by submerging the objects in the vapor phase of sub-chamber 7 which also contains the heated solution containing the solvent.

It will be realized that various changes may be made to the specific embodiments shown and described without departing from the principals and spirit of the present invention.

What is claimed is:

1. In a vapor generating and recovering apparatus for separating and recovering one component from a second component of a liquid solution having a housing including at least one chamber therein for vaporizing a first component from a liquid solution containing at least two components therein and a second chamber for recovering the vapor in the form of a liquid;
   heat emitting means disposed in heat emitting relation with said first chamber;
   heat absorbing means disposed in heat absorbing relation with said second chamber and around the periphery of said housing at a preselected distance above said chambers;
   the improvement which comprises: a weir of preselected height disposed between and separating said first chamber from said second chamber, a first temperature sensing device disposed within said second chamber at a preselected position at approximately the same vertical position as the top of said weir, and said heat absorbing means including coils with a heat transfer fluid therein and a flow control means, said coils disposed along the wall opposed to said weir, said temperature sensing device being disposed within the area enveloped by said coils, said flow control means is regulated in response to said first temperature sensing device; and, a second thermostatic sensing device spaced above said first thermostatic sensing device, said second thermostatic sensing device being in eletrical communication with said heat emitting means deactivating said heat emitting means at a preselected temperature.

2. The apparatus of claim 1, said heat absorbing means including a cooling coil disposed within said second chamber and a cooling coil extending around the outer periphery of said housing, first coils being in series with a flow control valve actuated by said temperature sensing device.

3. The apparatus of claim 2, said heat absorbing means including water as a heat transfer fluid.

4. The apparatus of claim 2, said flow control valve being downstream of said coils.

5. The apparatus of claim 2, said second chamber cooling coil being upstream of said cooling coil extending around the outer periphery of said housing.

6. The apparatus of claim 5, said flow control valve disposed downstream of said cooling coil extending around the outer periphery of said chambers.

* * * * *